(12) United States Patent
Woodruff et al.

(10) Patent No.: US 10,054,474 B2
(45) Date of Patent: Aug. 21, 2018

(54) BRUSH AUGER METER

(71) Applicants: Keith Woodruff, Mountainside, NJ (US); Brian Kaltner, Florham Park, NJ (US)

(72) Inventors: Keith Woodruff, Mountainside, NJ (US); Brian Kaltner, Florham Park, NJ (US)

( * ) Notice: Subject to any disclaimer, the term of this patent is extended or adjusted under 35 U.S.C. 154(b) by 64 days.

(21) Appl. No.: 15/232,986

(22) Filed: Aug. 10, 2016

(65) Prior Publication Data
US 2017/0043961 A1 Feb. 16, 2017

Related U.S. Application Data

(60) Provisional application No. 62/282,781, filed on Aug. 12, 2015.

(51) Int. Cl.
*G01F 13/00* (2006.01)

(52) U.S. Cl.
CPC .................. *G01F 13/005* (2013.01)

(58) Field of Classification Search
CPC ......... A47G 19/34; A01C 1/08; G01F 13/005; A01K 5/0291; A01K 5/0258
USPC ......... 222/412, 413, 185.1, 643, 639, 129.1, 222/158
See application file for complete search history.

(56) References Cited

U.S. PATENT DOCUMENTS

| | | | | |
|---|---|---|---|---|
| 2,535,476 A * | 12/1950 | Anderson | ............... | B65G 65/00 222/165 |
| 3,675,367 A * | 7/1972 | Amburn | ................... | A01C 1/00 198/657 |
| 3,734,777 A * | 5/1973 | Bratschitsch | ............ | A01C 1/08 118/303 |
| 3,913,343 A * | 10/1975 | Rowland | ................. | F25C 5/002 222/241 |
| 4,079,696 A * | 3/1978 | Weber | ....................... | A01C 1/08 118/417 |
| 4,503,803 A * | 3/1985 | Barnes | ..................... | A01C 1/08 111/173 |
| 4,586,459 A * | 5/1986 | Schultz | .................... | A01C 1/08 118/303 |
| 5,109,651 A * | 5/1992 | Stuart | ....................... | F25C 5/20 53/502 |
| 5,363,805 A * | 11/1994 | Wing | ................... | A01K 5/0291 119/51.11 |
| 5,988,461 A * | 11/1999 | Edney | ................ | B22D 17/2007 222/413 |
| 7,461,763 B1 * | 12/2008 | Winn | ....................... | A47F 1/03 222/158 |
| 7,748,575 B2 * | 7/2010 | Hanaoka | ................ | B65G 33/22 222/240 |

(Continued)

*Primary Examiner* — Charles P Cheyney
(74) *Attorney, Agent, or Firm* — Mark P. Stone (57) ABSTRACT

A device for metering granular or powered product having a meter housing, an auger housing positioned within the meter housing, the auger housing having an inlet opening for receiving the granular or powdered product, a rotatable spiral brush mounted within the auger housing, a first discharge outlet near one end of the auger housing for discharging granular or powdered product, and another opening near another end of the auger housing for discharging granular or powdered product not discharged through the first discharge opening. A method for metering granular or powdered product is also provided.

10 Claims, 7 Drawing Sheets

(56) References Cited

U.S. PATENT DOCUMENTS

| | | | | |
|---|---|---|---|---|
| 8,186,544 B2* | 5/2012 | Mills | ............... | B65D 83/0083 |
| | | | | 141/360 |
| 8,534,508 B2* | 9/2013 | Bush | ............... | A47J 47/01 |
| | | | | 222/129.1 |
| 8,701,595 B2* | 4/2014 | Jin | ............... | A01K 5/0291 |
| | | | | 119/51.01 |

\* cited by examiner

BRUSH AUGER METER

This design relates to a new improved method metering granular and powder products by means of an auger having bristles to create the spiral flights of the auger.

BACKGROUND OF THE INVENTION

Bristle augers have been used many times for transferring material by sweeping action of the bristles against the housing, especially for powdered materials. Bristle augers have been used in other applications such as cleaning device for strainer screen housings where the auger bristles outer edge within the housing provide intimate contact with the housing that sweeps the screen clean as the auger rotates.

In this design a stepper motor having the ability maintain a repeatable RPM, drives a spiral brush mounted on the spiral driveshaft that will deliver given amount of product volume for each RPM, based on the pitch or space between the bristle spirals, with the bristles not being required to be in intimate contact with the auger housing that will be explained in more detail further on the explanation. The advantage of the bristle auger is, it requires less torque to rotate bristle auger through the close off point or pinch point of the flight within the mating cylinder housing. This becomes apparent when a product and especially a granular product is caught between the outer edge of the bristle and the cylinder housing. In this case a granular particle will be forced through the bristle and into the following flight eliminating the crushing of the particle that normally occur with a metal auger design, and all other current granular meter systems, thereby reducing the amount of power required to drive this auger. This is especially important when a number of stepper motors of the auger meters are running simultaneously from the same power supply.

SUMMARY OF THE INVENTION

A method and device for metering granular and powdered product in a meter housing includes an auger housing located within the meter housing, and a spiral brush rotatably mounted within the auger housing for transporting the product through the auger housing. The auger housing defines an inlet therein for receiving product from a product container, and further defines two separate outlets for discharging product from the auger housing. A first stream of product is discharged from said auger housing through a first discharge outlet, while product not in the first stream which might otherwise become wedged between the spiral brush and the inner surface of the auger housing is discharged from the auger housing through a second discharge outlet. Product discharged from both the first and second discharge outlets in the auger housing is thereafter discharged from the meter housing by an outlet funnel in the meter housing and in communication with both of the first and second discharge outlets defined in the auger housing.

DESCRIPTION OF BEST MODE FOR CARRYING OUT THE INVENTION

Figure 1:
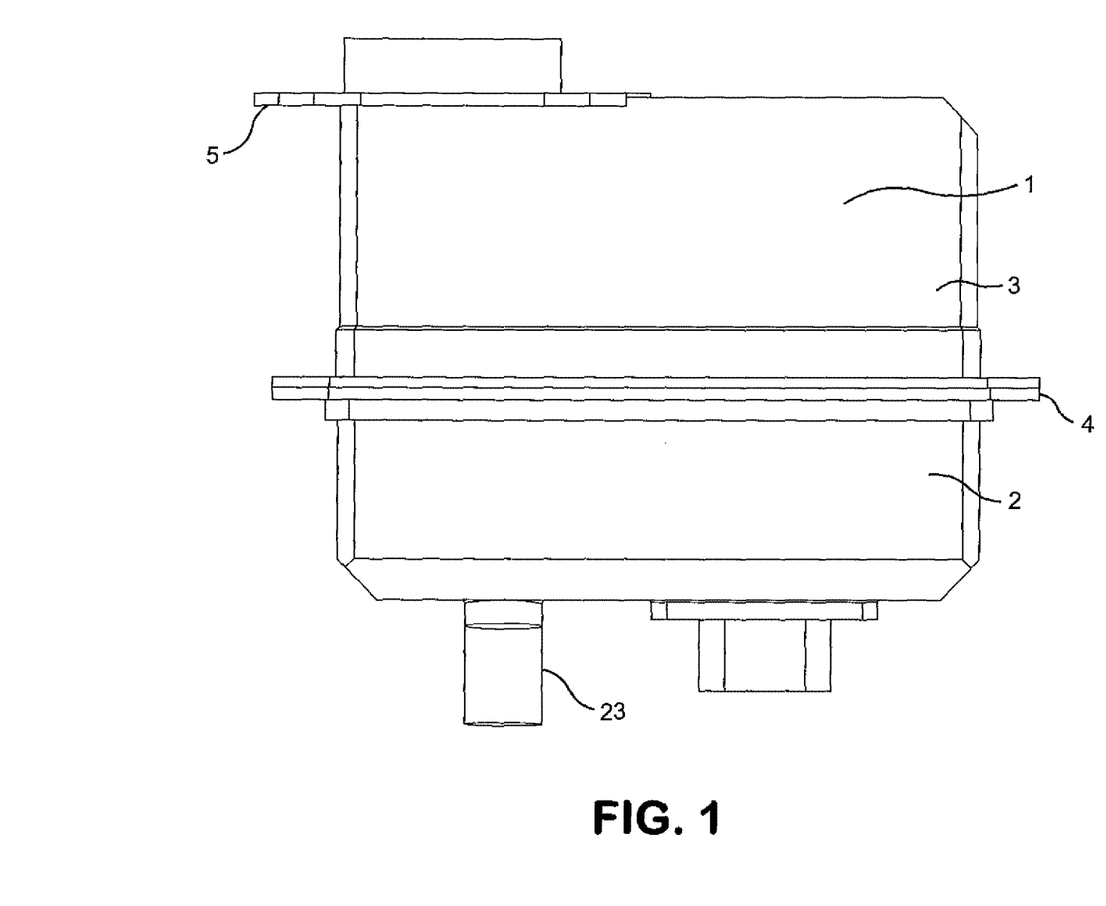
FIG. 1 is a side view of the meter.
Figure 2:
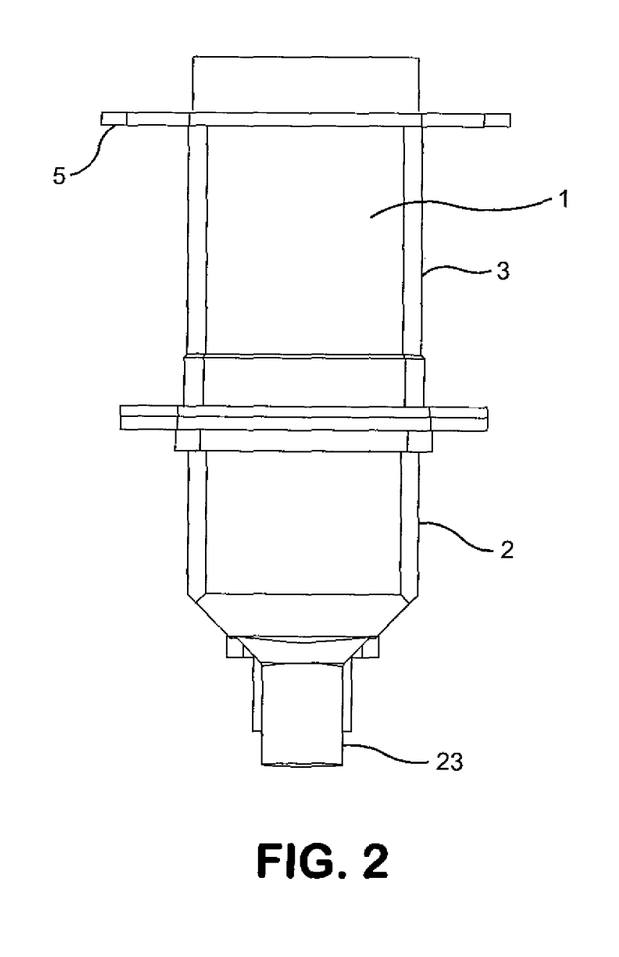
FIG. 2 is an end view of the meter
Figure 3:
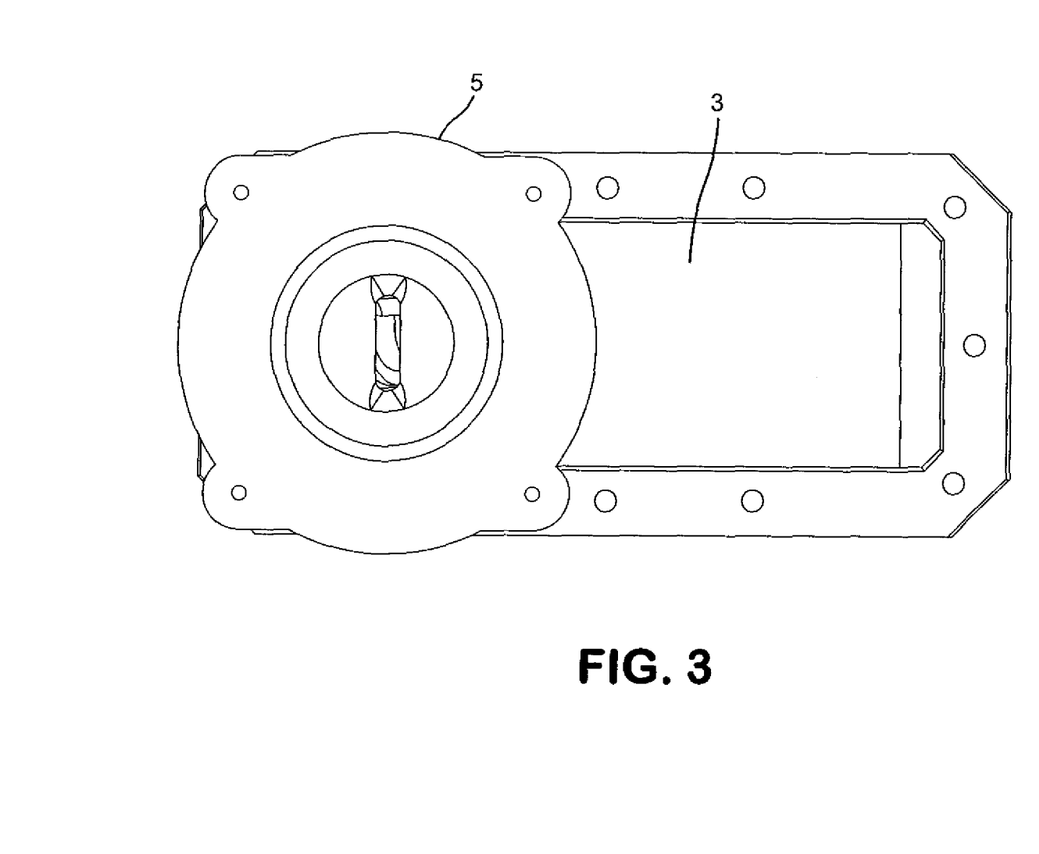
FIG. 3 is a top view of the meter
Figure 4:
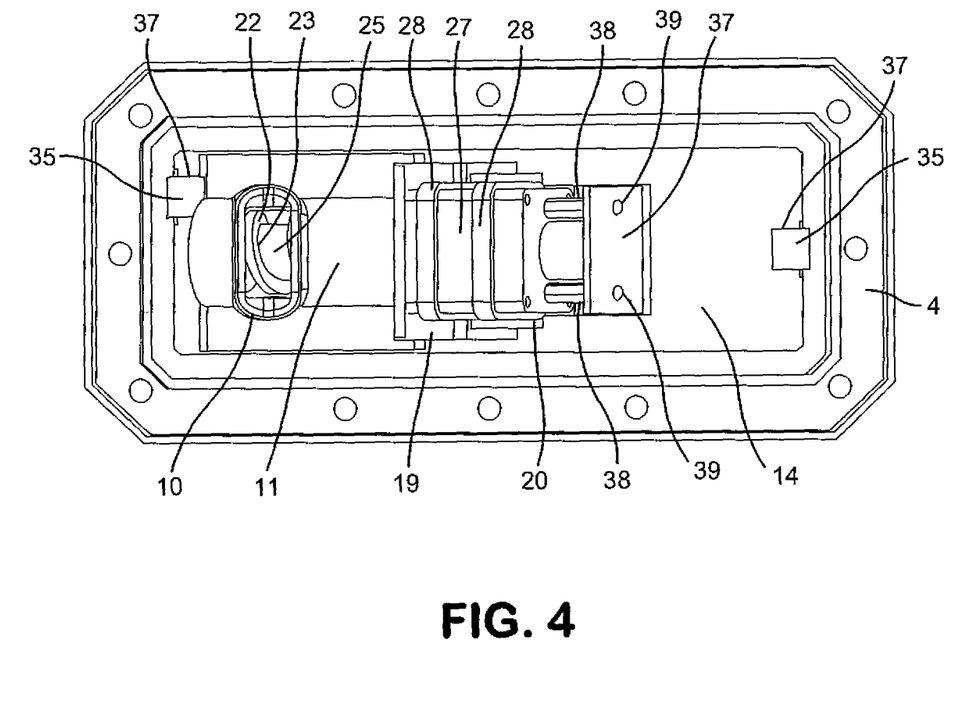
FIG. 4 is a top view with the top cover removed
Figures 5, 5A:
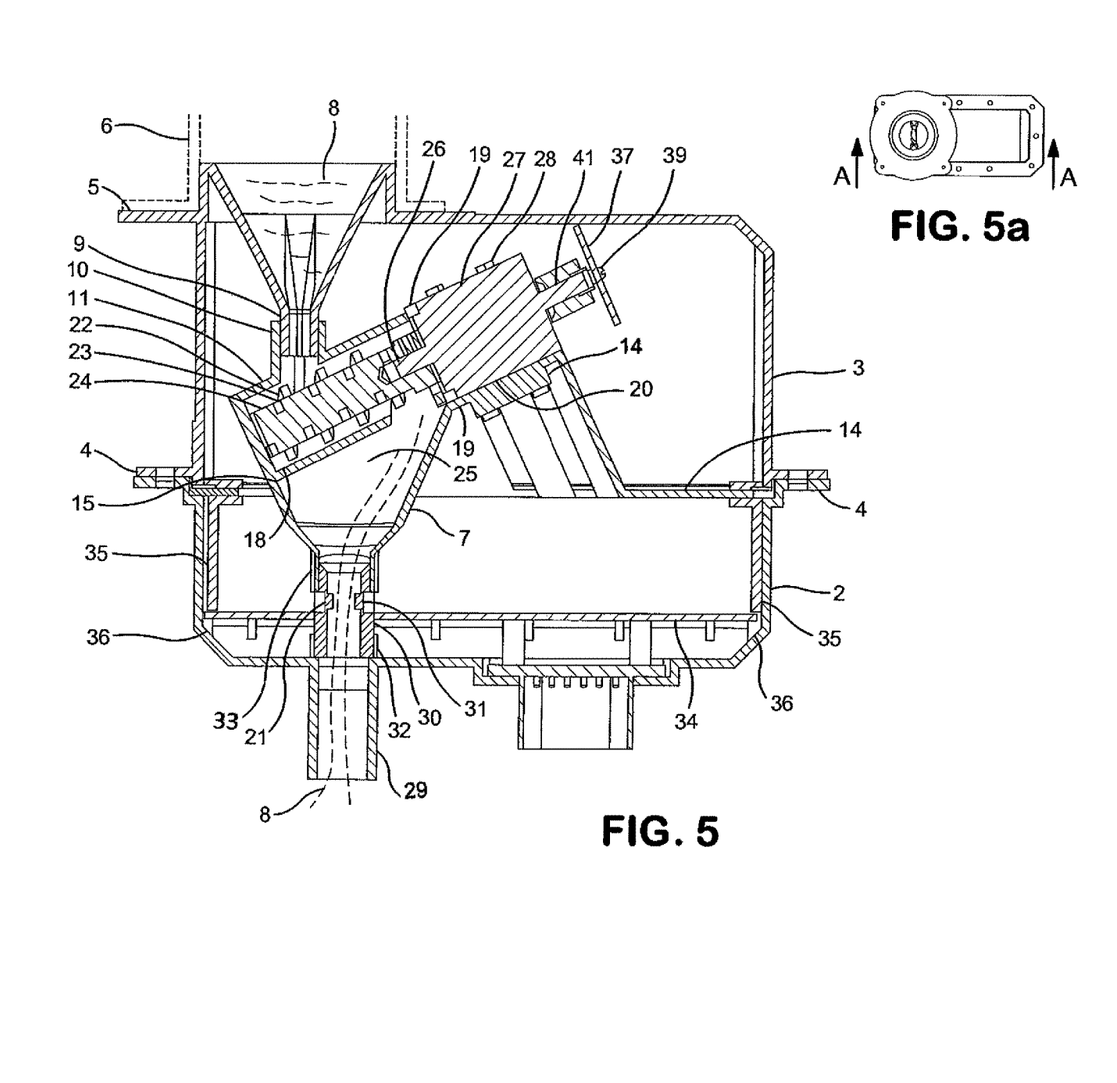
FIG. 5 illustrates a side section of the meter taken along Sec. A-A of FIG. 5a
FIG. 6 illustrates a section of the meter taken along Sec. E-E of FIG. 6a, and
FIG. 7 is a side view of the meter assembly
Figures 6, 6A:
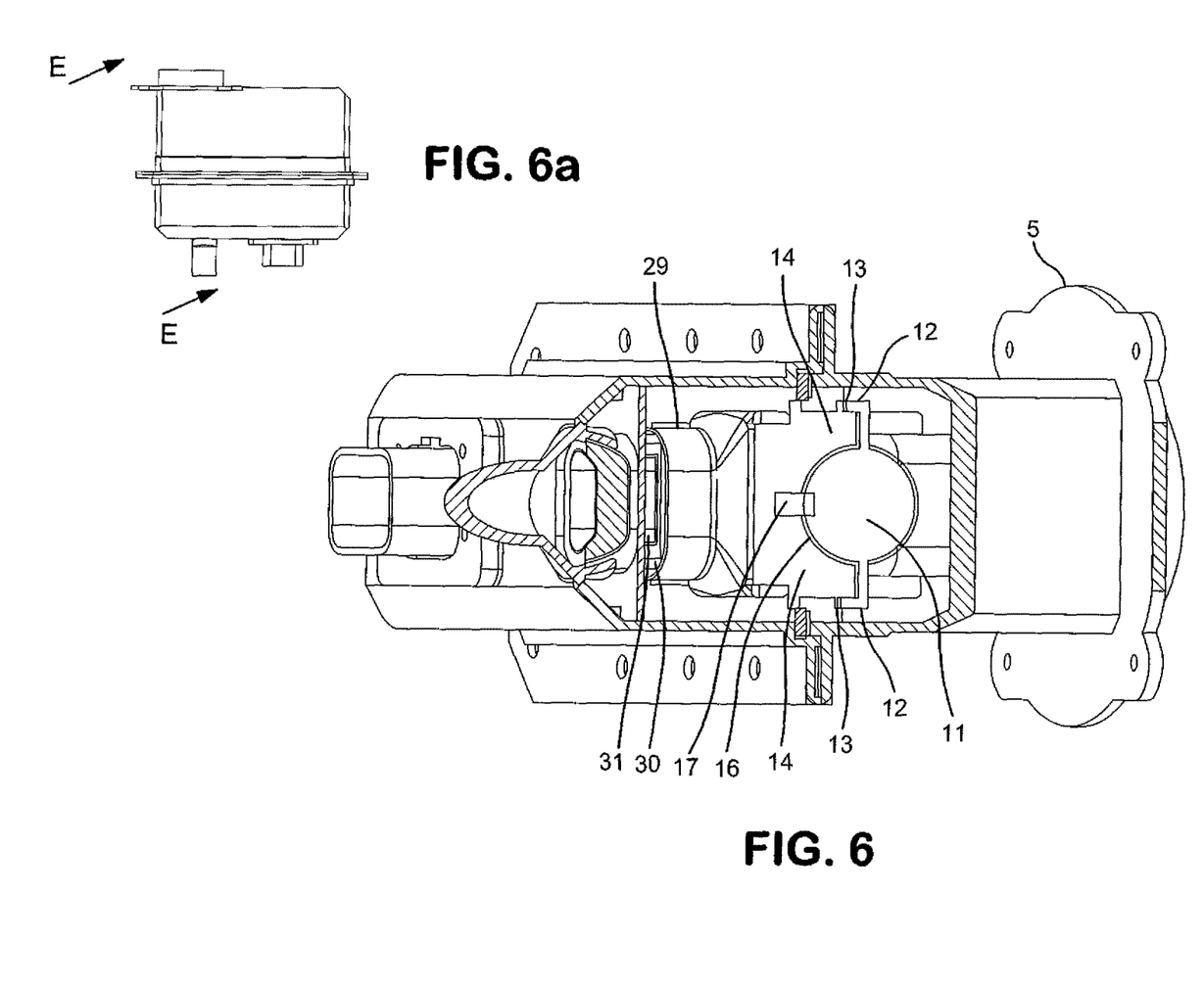
Figure 7:
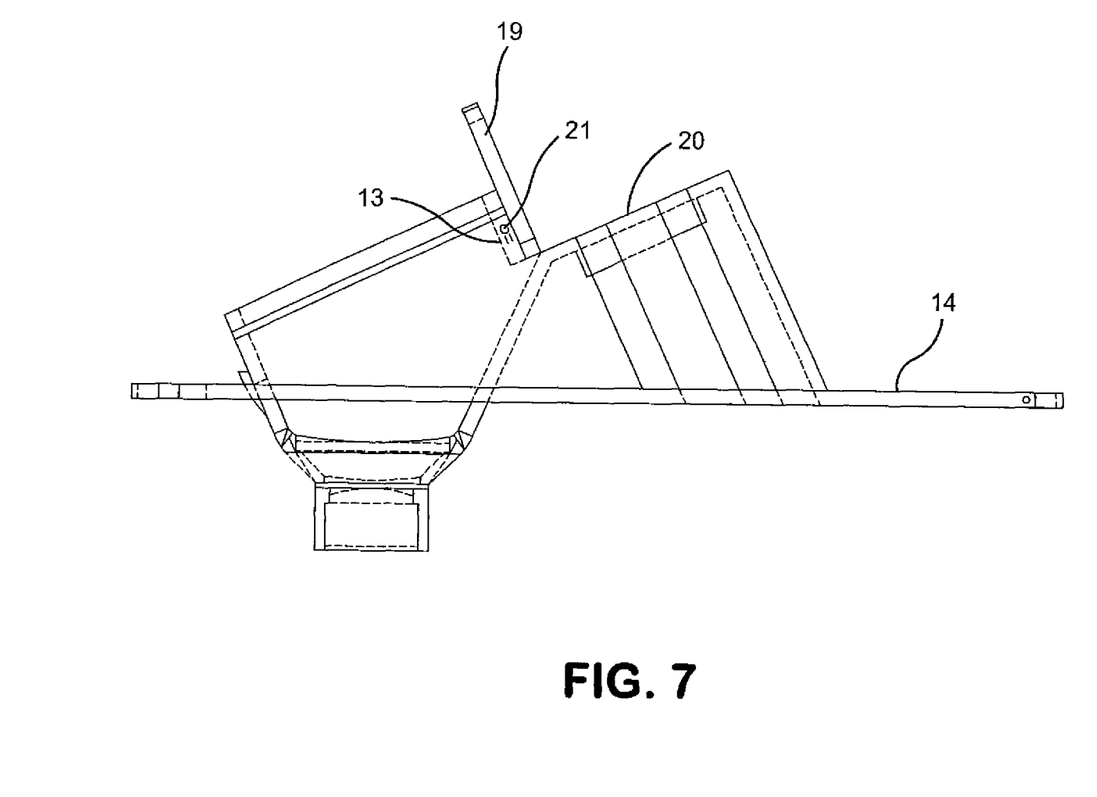

Referring to FIG. 1, the meter is constructed of a meter housing 1, with a bottom half 2, and a top half 3, of meter. Gasket 4, seals bottom half 2, to top half 3, of meter housing 1, by means of machine screws and nuts through flanges of bottom half 2, and top half 3, of housing 1. Attachment flange 5, of top half 3, of meter housing 1, is for attachments to product container 6. Referring to FIG. 5, cone shape funnel 7, of the top half 3, of housing 1, is designed to transfer product 8, from product container 6, through elongated product tube 9, of top half 3, of meter housing 1. Mating elongated product tube 10, of auger housing 11, is inserted into elongated product tube 9, of cone funnel 7. Auger housing 11, has clips 12, that is best shown on FIG. 6, for attachment to incline tabs 13, of motor tray 14. A silicone seal 15, between auger housing 11, and support yoke 16, of motor tray 14, is provided to compensate for any misalignment created by the variation of tolerances in the plastic parts. Stop clip 17, of motor tray 14, provides location for the auger housing 11, in the axial plane. Referring to FIG. 5, hole 18, of auger housing 11, provides for the exit of small particles that will be described in more detail further on in this description. Motor plate 19, resting on, surface 20, of motor tray 14, has tabs 21, that are snapped and locked into inclined tabs 13, of motor tray 14, as shown in FIG. 7. This completes the assembly of the funnel 25, of motor tray 14, that will be further described in the description of the operation of the device discussed later herein.

Referring to FIG. 5, spiral brush 22, with a metal clip that contains nylon bristles or other forms of bristles fabricated by those known in the brush manufacturing industry, is rotated into mating spiral slot 23, of auger shaft 24. Auger shaft 24 is attached to stepper motor shaft 26 of stepper motor 27. Stepper motor 27 is mounted on surface 20 of motor tray 14, at the same angle as incline tabs 13. The stepper motor 27 is secured in place by motor straps 28 that encircle the stepper motor and a motor tray bridge, of motor tray 14, for maximum air flow. Other forms of securing the stepper motor, such as a containment clip that would enclose the motor on 3 sides, were not selected because they would drastically reduce the airflow in and around stepper motor 27. Elongated discharge tube 29, of motor tray 14, allows for the inserting of an elongated sight glass 30 within discharge tube 29.

Sight glass 30, having two scratch resistant glass windows 31 on both sides is provided for verification of product. The configuration of the meter housing has been altered to allow for the logic circuit board sight glass to verify product flow, and the motor RPM sensor. The discharge end of sight glass 30 is fitted into elongated collar 33, of bottom half 2 of the meter housing for exit of product 8, through discharge tube 29, of bottom half 2 of the meter housing 1. A printed circuit board for logic control 34 is held in place by means of clips 35, and protrusions 36, of the bottom half 2 of the housing 1. The clips 35 are inserted into slot 37 of motor tray 14. A motor sensor 37 is attached to stepper motor 27 by standoffs 38, and screws 39. A sensor magnet assembly 40 is attached to stepper motor shaft 41, of stepper motor 27, to confirm the RPM of the stepper motor.

Description of the Operation of the Brush Auger Meter

When auger 24 is rotated by the stepper motor 27, product 8 particles in the container 6 flow down through funnel 7, through elongated product tube 9, and into mating elongated tube 10 of the auger housing 11. Product particles 8 flow around the auger 24 and the spiral brush 22, while rotating, filling the void created by the rotation of the spiral brush 22, as product particles 8 advance into the auger housing 11. Any of product particles 8 caught between auger brush 22 and the auger housing 11, will be forced through the auger brush 22, and into the following flight. This will eliminate the normal crushing of product particles that other meter designs experience, and greatly reduce the power requirement to drive the meter. Very small product particles 8, that are difficult to advance up the inclined auger brush 22 because they slip back into to the elongated tube 10 area, will, over a period of time, clog the auger brush and prevent the meter from working properly. These particles exit the device through hole 18. Product particles 8 continue to flow through the auger housing 11, and are dispersed into the enclosed funnel 25 of the motor tray 14. Product particles 8 flow down through the funnel 25, and are discharged out through discharge tube 29, and into the elongated sight glass 30, which provides visual movement of the product particles 8, which can be detected by the logic board 34. Product 8 then flows out of the sight glass 30, and into an elongated collar 32 of the bottom half 2 of the meter housing 1, and are discharged out of the meter housing 1, through the discharge tube 33. Motor sensor circuit board 37 is attached to the stepper motor 27, by means of standoffs 38 and screws 39, and provides an accurate RPM verification of speed changes and very accurate metering of product.

The invention claimed is:

1. A device for metering granular or powdered product, said device comprising:
   a meter housing;
   an auger housing within said meter housing, said auger housing having an inlet opening for receiving granular or powdered product from a product container;
   a spiral brush rotatably mounted within said auger housing for transporting said granular or powdered product in said auger housing;
   a first discharge outlet defined in said auger housing proximate to a first end of said auger housing for discharging a first stream of granular or powdered product from said auger housing into an outlet funnel at least partially received within the meter housing for discharging said first stream of product from said meter housing, and
   a second discharge outlet provided by an opening defined in said auger housing proximate to a second end of said auger housing and separated from said first discharge outlet and said inlet opening for discharging granular or powdered product not discharged with said first stream through said first discharge outlet into said outlet funnel for discharging said product from said meter housing through said outlet funnel for preventing granular or powdered product from becoming wedged between the spiral brush and the auger housing,
   wherein all product discharged through said first and second discharge outlets in said auger housing is discharged from said meter housing through said outlet funnel.

2. The device as claimed in claim 1, wherein said auger housing and said spiral brush therein are oriented at an inclined angle relative to the horizontal.

3. The device as claimed in claim 2, wherein said discharge outlet defined proximate to said first end of said auger housing is elevated relative to the opening defined proximate to said second end of said auger housing.

4. The device as claimed in claim 1, wherein said meter housing further includes means for monitoring the flow of granular or powdered product through said meter housing.

5. The device as claimed in claim 4, wherein said means for monitoring includes a transparent element by which flow of granular or powdered product through said meter housing is visually observable.

6. A method for metering granular or powdered product, said method comprising the steps of:
   introducing granular or powdered product into an inlet opening defined in an auger housing having a spiral brush rotatably mounted therein for transporting said product in said auger housing, said auger housing being located within a meter housing;
   discharging a first stream of granular or powdered product from a first discharge opening defined in said auger housing proximate to a first end of said auger housing and into an outlet funnel at least partially received within the meter housing for discharge from said meter housing; and
   discharging granular or powdered product wedged between the spiral brush and the housing and not discharged with said first stream from a second discharge opening defined in said auger housing proximate to a second end of said auger housing and separated from said inlet and said first discharge opening and into said outlet funnel of the meter housing for discharge from said meter housing,
   wherein all product discharged through said first and second discharge outlets in said auger housing is discharged from said meter housing through said outlet funnel.

7. The method as claimed in claim 6, further including the step of orienting said housing and said spiral brush therein at an inclined angle relative to the horizontal.

8. The method as claimed in claim 7, wherein said housing and said spiral brush therein are inclined such that said discharge opening proximate to said first end of said housing is elevated above said opening proximate to said second end of said housing.

9. The method as claimed in claim 6, further including the step of providing means for monitoring the flow of granular or powdered product.

10. The method as claimed in claim 9, wherein said means for monitoring includes means for visually observing the flow of granular or powdered product.

* * * * *